Sept. 8, 1931. W. J. SPIRO 1,822,246
PACKING BOX FOR ATTACHING MEANS
Filed Nov. 30, 1928
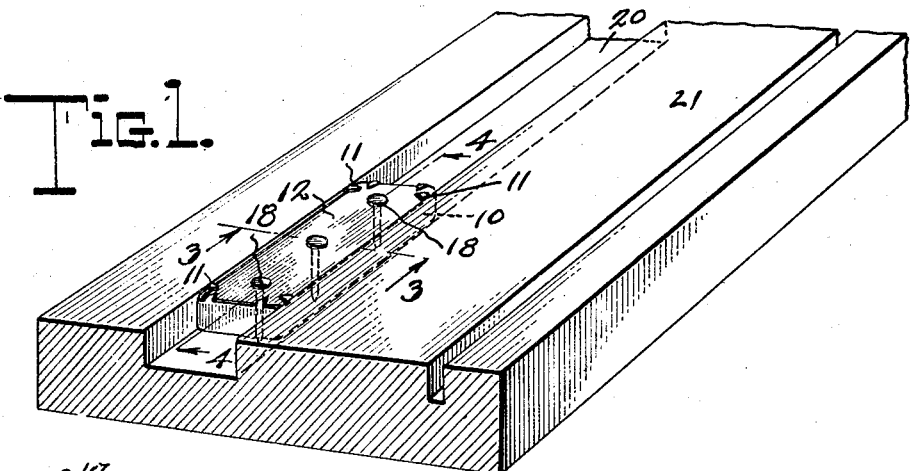
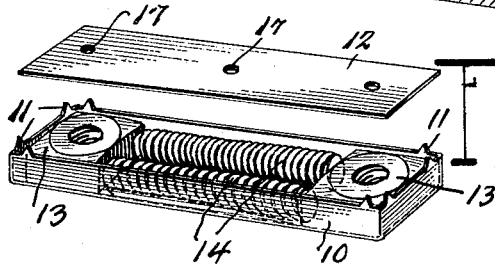
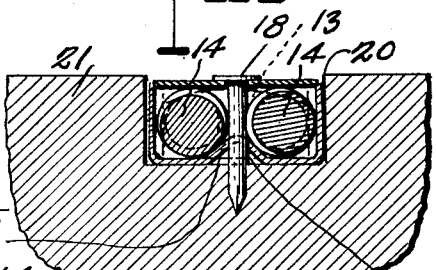
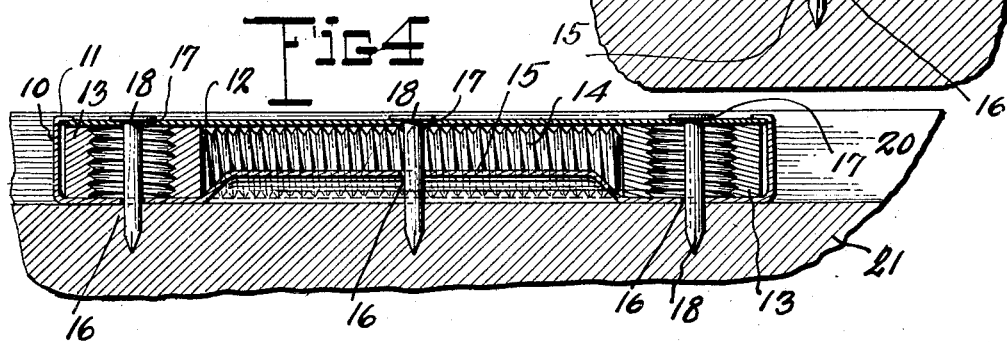
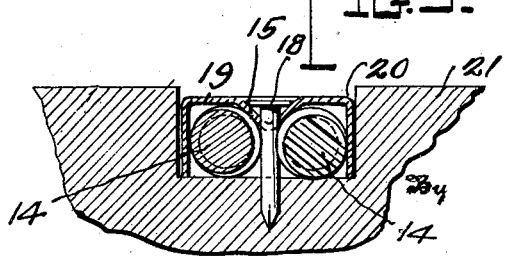
Inventor
Walter J. Spiro
Alfred T. Gage
By
Attorney Patented Sept. 8, 1931

1,822,246

UNITED STATES PATENT OFFICE

WALTER J. SPIRO, OF WHITE PLAINS, NEW YORK

PACKING BOX FOR ATTACHING MEANS

Application filed November 30, 1928. Serial No. 322,922.

This invention relates to a packing box for attaching means, and particularly to a container adapted for application to a recess in the under face of a running board for vehicles to permit the attaching bolts therefor to be temporarily disposed in position convenient for shipment and subsequent use.

Such running boards when formed of wood are usually scored or grooved upon their under face to prevent warping and when packed or shipped are disposed in flat contact with each other to economize in bulk, which could not be accomplished were the attaching bolts applied to the boards during manufacture. It is very desirable that the attaching bolts be shipped in connection with the boards to insure the use of the proper size and thread of bolt to cooperate with the supporting brackets of the vehicle. Such bolts are ordinarily shipped in separate packages which frequently become lost or misplaced resulting in the loss of valuable time in assemblage. I have therefore provided for the temporary attachment of the nuts and bolts to the board in convenient position for detachment and use, while not interfering with the packing of the boards in direct contact with each other.

To accomplish these results I enlarge one of the grooves upon the under face of the running board sufficiently to receive the container box, or otherwise form a recess at the under face of the board, within which the box containing the nested nuts and bolts is disposed and retained by a securing device passed through the body of the box and entering the board. To detach the nuts and bolts for use this device is withdrawn and the box removed so that its contents are directly accessible for use. This packing arrangement avoids the trouble and expense of separately handling the attaching devices and insures the use of a proper character thereof to cooperate with the supporting brackets of a vehicle.

The invention has for an object to provide a novel and improved construction comprising a box adapted to be seated in a recessed body and to contain nested attaching members, with means passing through the box intermediate its ends for temporarily securing it within such recess.

Another object of the invention is to present a new structure of angular packing box adapted to receive nut members at each end and intermediate parallel bolt members, with the bottom of the box ridged between the bolt members and formed with apertures to receive securing means alined with the nut openings and intermediate said bolt members.

A further object of the invention is to provide an improved packing box formed from sheet material and having at its open face bendable lugs disposed to secure a cover plate in position, said box and plate being formed with alined apertures to receive detachable securing means.

Other and further objects and advantages of the invention will be hereinafter set forth and the novel features thereof defined by the appended claims.

In the drawings—

Figure 1 is a bottom perspective of a running board showing the box applied;

Figure 2 is a detail perspective of the box with the cover removed;

Figure 3 is a cross section on line 3—3 of Figure 1;

Figure 4 is a longitudinal section on line 4—4 of Figure 1; and

Figure 5 is a detail section of a modified application.

Like numerals refer to like parts in the several figures of the drawings.

In the form of the invention herein disclosed the box 10 is disposed in a groove or recess 20 formed at the under face of a running board 21. This box may be formed from a single blank and is of elongated and substantially rectangular configuration. The open edge of the box may be provided adjacent its corners with integral bendable lugs 11 disposed to temporarily retain the cover plate 12 in position during the application of the box to the board and after its removal therefrom.

The box is designed to receive a nut member 13 at each end and intermediate parallel bolt members 14. The bottom of the box is formed with a longitudinal ridged portion 15 between these bolt members which acts to retain them in parallel relation and stiffens the box against bending when being attached or removed from the running board. The box bottom is also formed with apertures 16 which are alined with similar apertures 17 in the cover plate and adapted to receive the devices for temporarily securing the box, such as nails or screws, as at 18. These apertures are also alined with the openings in the nut members and the ridge intermediate the bolt members, so that the securing devices function to retain the cover and also the attaching members within the box against any displacement in handling of shipping the boards.

In the modified application of the box shown in Figure 5, cover is omitted, and the open side of the box 19 brought into contact with the body of the running board to retain the contents thereof. The construction of the box and its securing means is similar to that before described.

The operation of the invention will be understood from the foregoing description from which it will be seen that the nested attaching means are protected and readily secured to the running board for shipment therewith. When desired for use it is only necessary to withdraw the temporary securing nails and the bolt members are convenient for immediate assemblage upon the board supporting brackets.

While the specific construction of the several parts has been shown and described the invention is not confined thereto, as changes and alterations may be made without departing from the spirit of the invention as recited in the following claims.

What I claim is:—

1. The combination with the running board of a vehicle formed in its under surface with a longitudinally ranging slot, of a container housing accessories for said board and removably positioned in said slot, with its free surface positioned to avoid any projection below the bottom surface of the running board, and means for removably securing said container within said slot.

2. The combination with the running board of a vehicle formed in its under surface with a longitudinally ranging slot, of a packing box removably positioned in said slot, said box including a body, a top removably secured to the body, the box being arranged in the slot, with the top so positioned as to avoid projection beyond the lower surface of the board, and means passing through the top and body to unite the box and running board against separation, said box being arranged to contain accessories to be used with the running board.

3. The combination with the running board of a vehicle formed in its under surface with a longitudinally ranging slot, of a packing box removably positioned in said slot, said box including a body, a top removably secured to the body, the box being arranged in the slot, with the top so positioned as to avoid projection beyond the lower surface of the board, and means passing through the top and body to unite the box and running board against separation, said box being arranged to contain accessories to be used with the running board, said means directly cooperating with and serving to prevent displacement of certain accessories when in the box.

4. The combination with the running board of a vehicle formed in its under surface with a longitudinally ranging slot, of a packing box to be removably positioned in said slot, said box including a body shaped to receive a nut at each end, a pair of aligned bolts between the nuts, a cover fitting the body, said body and cover being arranged in the slot to position the cover in a plane to avoid projection beyond the under surface of the board, and means passing through the cover and body to secure the box in fixed relation to the running board, said means in part passing through the nuts in the body.

5. The combination with the running board of a vehicle formed in its under surface with a longitudinally ranging slot, of a packing box to be positioned in said slot, said box including a body shaped to receive a nut at each end thereof and to receive spaced, parallel bolts extending between the nuts, a cover removably secured to the body, the position of the box within the slot arranging the cover so as to avoid projection below the under surface of the running board, one of the parts of the box having an offset portion to cooperate with and space the bolts in the body, and nails passed through the top and body and into the board to secure the box in position in the slot.

6. The combination with the running board of a vehicle formed in its under surface with a longitudinally ranging slot, of a packing box to be positioned in said slot, said box including a body shaped to receive a nut at each end thereof and to receive spaced, parallel bolts extending between the nuts, a cover removably secured to the body, the position of the box within the slot arranging the cover so as to avoid projection below the under surface of the running board, one of the parts of the box having an offset portion to cooperate with and space the bolts in the body, and nails passed through the top and body and into the board to secure the box in position in the slot, one at least of said nails passing through the offset portion.

In testimony whereof I affix my signature.

WALTER J. SPIRO.